United States Patent [19]
Igarashi et al.

[11] Patent Number: 5,532,055
[45] Date of Patent: Jul. 2, 1996

[54] COMPOSITE FOAM MOLDED ARTICLE PROCESS FOR PRODUCTION THEREOF, AND FOAMABLE POWDER COMPOSITION

[75] Inventors: Toshio Igarashi, Kyoto; Sueharu Shinohara, Takatsuki; Masayuki Tatsumi, Ibaraki; Tadashi Hikasa, Sodegaura; Hiroaki Mendori, Ichihara, all of Japan

[73] Assignee: Sumitomo Chemical Company, Limited, Osaka, Japan

[21] Appl. No.: 975,966

[22] Filed: Nov. 13, 1992

Related U.S. Application Data

[63] Continuation of Ser. No. 886,410, May 21, 1992, abandoned.

[30] Foreign Application Priority Data

| May 23, 1991 | [JP] | Japan | 3-118712 |
| Jun. 24, 1991 | [JP] | Japan | 3-151595 |
| Aug. 29, 1991 | [JP] | Japan | 3-218506 |
| Aug. 29, 1991 | [JP] | Japan | 3-218523 |
| Nov. 21, 1991 | [JP] | Japan | 3-306163 |

[51] Int. Cl.$^6$ .............................. B32B 3/26; B32B 27/32
[52] U.S. Cl. ................... 428/318.6; 428/318.8; 428/319.7; 428/319.9; 521/51; 521/134; 521/140
[58] Field of Search ................ 521/51, 134, 140; 428/318.6, 318.8, 319.7, 319.9

[56] References Cited

U.S. PATENT DOCUMENTS

| 4,212,787 | 7/1980 | Matsuda et al. | |
| 4,247,652 | 1/1981 | Matsuda et al. | |
| 4,721,643 | 1/1988 | Harayama et al. | 428/318.6 |
| 4,913,944 | 4/1990 | Gilman, Jr. | 428/318.6 |
| 5,075,162 | 12/1991 | Okubo et al. | 428/318.6 |

FOREIGN PATENT DOCUMENTS

| 409992 | 1/1991 | European Pat. Off. |
| 479580 | 4/1992 | European Pat. Off. |
| 49-129757 | 12/1974 | Japan |
| 58-132507 | 8/1983 | Japan |
| 2255738 | 10/1990 | Japan |

OTHER PUBLICATIONS

English Abstract, Japanese laid open Appln. No. 2-57309, Feb. 1990.

English Abstract, Japanese laid open Appln. No. 2-57310, Feb. 1990.

English Abstract, Japanese laid open Appln. No. 3-177447, Aug. 1991.

*Primary Examiner*—Jenna L. Davis
*Assistant Examiner*—Blaine Copenheaver
*Attorney, Agent, or Firm*—Cushman Darby & Cushman

[57] ABSTRACT

An integrally molded composite article comprised of (I) a nonfoam layer formed from a thermoplastic elastomer powder composition (A) and (II) a foam layer formed from a foamable composition comprised of (i)(B) a thermoplastic synthetic resin powder, and (C) a heat decomposable foaming agent or (ii)(B) a thermoplastic synthetic resin powder, (C) a heat decomposable foaming agent and (D) a liquid coating agent, wherein the thermoplastic elastomer powder (A) is comprised of a composition of an ethylene-α-olefin copolymer rubber and a polyolefin resin or a thermoplastic elastomer powder comprised of a partially cross-linked composition of an ethylene-α-olefin copolymer rubber and a polyolefin resin, the thermoplastic elastomer powder having a complex dynamic viscosity $\eta^*(1)$ at 250° C. and a frequency of 1 radian/sec of not more than $1.5 \times 10^5$ poise and having a Newtonian viscosity index n, calculated by the following formula using the above-mentioned complex dynamic viscosity $\eta^*(1)$ and the complex dynamic viscosity $\eta^*(100)$ at a frequency of 100 radians/sec, of not more than 0.67:

$$n = \{\log \eta^*(1) - \log \eta^*(100)\}/2.$$

8 Claims, 4 Drawing Sheets

COMPOSITE FOAM MOLDED ARTICLE PROCESS FOR PRODUCTION THEREOF, AND FOAMABLE POWDER COMPOSITION

This is a continuation of application Ser. No. 07/886,410, filed on May 21, 1992, which was abandoned upon the filing hereof.

BACKGROUND OF THE INVENTION

1. Field of the Invention

The present invention relates to an integrally formed composite foam molded article comprising a nonfoam layer formed from a thermoplastic elastomer powder composition and a foamed layer formed from a foamable powder composition, a process for production thereof, and a foamable powder composition.

2. Description of the Related Art

In recent years, there has been a demand for covering materials for the interior of automobiles etc. which are light in weight, excellent soft feelings, and of high quality feelings and which are given complicated patterns such as a leather grain pattern or stitch pattern.

On the other hand, as a method for producing a cushiony covering material, there is known a method of forming a covering material from a vinyl chloride based resin composition by a powder molding method, then filling and causing to foam a urethane material in the same way as conventional vacuum molded articles so as to produce a covering material with a layer of urethane bonded to it.

Further, there has been proposed a method for simultaneously integrally forming a nonfoam layer comprised of a vinyl chloride based resin and a foamed layer comprised of a vinyl chloride based resin by a powder molding method.

In these methods, however, while it is possible to impart complicated patterns and the resultant covering material is soft in touch, there are disadvantages inherent to polyvinyl chloride, that is, an insufficiently light weight and the production of acidic substances upon incineration during disposal of cars, which causes atmospheric pollution, acid rain, etc., making the resin inferior in "cleanness". A sufficiently satisfactory covering material has not been obtained.

SUMMARY OF THE INVENTION

Accordingly, the objects of the present invention are to eliminate the above-mentioned disadvantageous of the prior arts and to provide a composite foam molded article superior in cleanness, light in weight, soft in touch and given complicated patterns.

Other objects and advantages of the present invention will be apparent from the following description.

In accordance with the present invention, there is provided an integrally formed composite foam molded article comprising (I) a nonfoam layer formed from (A) a thermoplastic elastomer powder composition and (II) a foamed layer formed from a foamable composition comprised of (i)(B) a thermoplastic synthetic resin powder and (C) a heat decomposable foaming agent or (ii)(B) a thermoplastic synthetic resin powder, (C) a heat decomposable foaming agent and (D) a liquid coating agent, wherein the thermoplastic elastomer powder (A) is comprised of a composition of an ethylene-α-olefin copolymer rubber and a polyolefin resin or a thermoplastic elastomer powder comprised of a partially cross-linked composition of an ethylene-α-olefin copolymer rubber and a polyolefin resin, the thermoplastic elastomer powder having a complex dynamic viscosity $\eta^*(1)$ at 250° C. and a frequency of 1 radian/sec of not more than $1.5\times10^5$ poise and having a Newtonian viscosity index n, calculated by the following formula using the above-mentioned complex dynamic viscosity $\eta^*(1)$ and the complex dynamic viscosity $\eta^*(100)$ at a frequency of 100 radians/sec, of not more than 0.67:

$$n=\{(\log \eta^*(1)-\log \eta^*(100)\}/2$$

a process for production thereof, and a foamable powder composition for the same.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
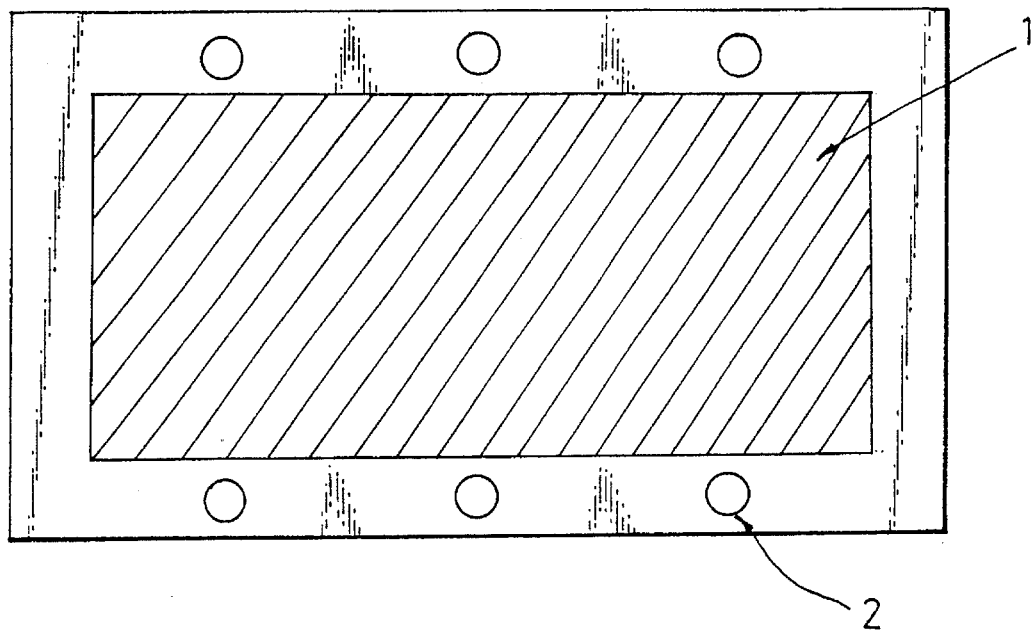
FIG. 1 is a plane view of a powder feed box.

In view of the above-mentioned situation, the present inventors engaged in earnest studies on a method of powder molding to produce a cushiony covering material superior in cleanness, light in weight, soft in touch, and given complicated patterns and found that by using a specific thermoplastic elastomer powder as a nonfoam layer starting material, the above-mentioned objects can be achieved and thus completed the present invention has been completed.

The present invention will be explained in detail below.

The present invention is characterized by the use, as the nonfoam layer starting material, of a thermoplastic elastomer powder comprised of an elastomer composition of an ethylene-α-olefin copolymer rubber and a polyolefin resin or a thermoplastic elastomer powder comprised of a partially cross-linked elastomer composition obtained by dynamically cross-linking a mixture of an ethylene-α-olefin copolymer rubber and a polyolefin resin in the presence of a cross-linking agent. Examples of the ethylene-α-olefin copolymer rubber are ethylene-propylene copolymer rubber, ethylene-propylene-nonconjugated diene copolymer rubber, and other rubber having olefins as main constituents. Examples of the nonconjugated diene are dicyclopentadiene, ethylidenenorbornene, 1,4-hexadiene, cyclooctadiene, methylenenorbornene. Among these, ethylene-propylene-ethylidenenorbornene rubber (hereinafter referred to as EPDM) is preferred. When EPDM is used, an elastomer powder superior in, for example, heat resistance, tensile properties may be obtained.

The Mooney viscosity of the ethylene-α-olefin copolymer rubber, i.e., Mooney viscosity measured at 100° C. according to ASTM D-927-57T ($ML_{1+4}100°$ C.), is preferably from 130 to 350, more preferably 200 to 300.

It is also preferable to use an oil-extended olefin copolymer rubber comprised of ethylene-α-olefin copolymer rubber and a mineral oil based softening agent, such as paraffinic process oil added thereto. In this case, not only does the melt flowability rise, but also the softness of the molded article is improved. The content of the mineral oil softening agent is preferably 30 to 120 parts per 100 parts by weight of ethylene-α-olefin copolymer rubber.

The polyolefin resin usable in the present invention preferably include polypropylene, a copolymer of polypropylene and ethylene, and a copolymer of propylene and an α-olefin other than propylene. In particular, when a copolymer resin of propylene and butene is used, it is possible to lower the hardness of the molded article.

When the melt flow rate (MFR, measured according to JIS K-7210 at 230° C. under a load of 2.16 kg) of the polyolefin resin is less than 20 g/10 min, it becomes difficult for the particles of powder to melt-adhere to each other during the powder molding and the strengths of the molded article are decreased, so usually a resin of 20 g/10 min or more is used. Preferably, the MFR is 50 g/10 min or more.

The thermoplastic elastomer usable in the present invention is a composition of an ethylene-α-olefin copolymer rubber and polyolefin or a partially cross-linked composition obtained by dynamic cross-linking of the composition, but the ratio of the ethylene-α-olefin copolymer rubber and the olefin resin is preferably 5:95 to 80:20 by weight ratio.

In producing the partially cross-linked composition, an organic peroxide is usually used as a cross-linking agent. Examples of the organic peroxides usable in the present invention are dialkyl peroxide. Further, it is preferable to perform the dynamic cross-linking using a very small amount of an organic peroxide in the presence of a cross-linking coagent such as a bismaleimide compound. In this case, the ethylene-α-olefin copolymer rubber is suitably cross-linked to give a heat resistance and simultaneously a high flowability. The cross-linking agent is preferably used in an amount of not more than 1.5 parts by weight, more preferably not more than to 0.6 part by weight, per 100 parts by weight of the composition of the ethylene-α-olefin copolymer rubber and the polyolefin resin. The organic peroxide is preferably used in an amount of not more than 0.2 part by weight, more preferably not more than 0.1 part by weight, and most preferably not more than 0.07 part by weight.

As the apparatus used for the dynamic cross-linking, a single-screw kneading extruder or a twin-screw kneading extruder or other continuous kneading extruders are suitably used. When a twin-screw kneading extruder is used, if the extrusion cross-linking is performed at a shear rate of less than $10^3$ sec$^{-1}$, the dispersed particle size of the ethylene-α-olefin copolymer rubber becomes large and it becomes difficult to realize the viscosity conditions of the present invention, so it is preferable to perform continuous extrusion cross-linking at a shear rate of $10^3$ sec$^{-1}$ or more.

The thermoplastic elastomer in the present invention has a complex dynamic viscosity η*(1) measured at 250° C. and a frequency of 1 radian/sec of not more than $1.5\times10^5$ poise, preferably not more than $1.0\times10^5$ poise.

When the complex dynamic viscosity is more than $1.5\times10^5$ poise, the elastomer powder no longer flows in a molten state on the surface of the mold and molding becomes impossible with a powder molding method with a shear rate during processing of an extremely low, e.g., 1 sec$^{-1}$ or less.

Further, the Newtonian viscosity index n calculated by the following formula using the complex dynamic viscosity η*(1) measured at 250° C. and a frequency of 1 radian/sec and a complex dynamic viscosity η*(100) measured at a frequency of 100 radians/sec is not more than 0.67, preferably not more than 0.60:

$$n=\{(\log \eta*(1)-\log \eta*(100)\}/2$$

When the Newtonian viscosity index n is more than 0.67, even assuming the complex dynamic viscosity η* (1) measured at a frequency of 1 radian/sec is not more than $1.5\times10^5$ poise, the frequency dependence of the complex dynamic viscosity becomes larger and, with molding methods with an extremely low shaping pressure during molding of less than 1 kg/cm$^2$ such as in powder molding, the heat-fusion of molten elastomer powder particles becomes incomplete and only a molded article with low mechanical properties can be obtained.

The thermoplastic elastomer composition usable in the present invention may be used by blending with not more than 50 parts by weight of non-cross-linked ethylene-α-olefin copolymer rubber or ethylene-α-olefin copolymer resin, based upon 100 parts by weight of the elastomer so as to further improve the flexibility of the molded article. As the α-olefin, in this case, the propylene and butene etc. may be used alone or together. In particular, an ethylene-propylene copolymer rubber having an ethylene content of 40 to 90 percent by weight, preferably 70 to 85 percent by weight and having an $ML_{1+4}$100° C. of 50 or less is preferable.

The thermoplastic elastomer powder of the present invention is usually manufactured by pulverizing the above-mentioned thermoplastic elastomer composition at a low temperature not more than the glass transition temperature. For example, a freeze pulverization method using liquid nitrogen is suitably used. The powder may be obtained by mechanically pulverizing elastomer composition pellets, which are cooled to −70° C. or lower, preferably −90° C. or lower, by using a ball mill or other impact type pulverizer. When pulverized at a temperature higher than −70° C., the particles of the pulverized elastomer powder become rougher and the powder moldability becomes lower, and therefore, this is not desirable. To prevent the polymer temperature from increasing the glass transition temperature or more during the pulverization operation, a method which generates little heat and has a high pulverization efficiency is preferable. Further, it is preferable that the pulverization apparatus itself be cooled by outside cooling.

The resultant elastomer powder is preferably pulverized to a degree such that 95% or more of the total weight can pass through a 32 mesh sieve of a Tyler standard sieve. When the 32 mesh sieve blocking rate exceeds 5%, this can become one factor causing unevenness of thickness during the pulverization and molding. Uneven thickness causes unevenness in the flexibility of the molded article and leads to a susceptibility to creasing upon bending etc., becoming a cause detracting from the commercial value of the molded article.

When performing powder molding using the thermoplastic elastomer powder composition used in the present invention, sometimes the adhesion to the inside surface of the mold is strong when detaching the molded article from the mold. When the molded article is forced to be removed from the mold, creases or whitening may occur. To prevent this, it is possible to coat the inside surface of the mold before the molding by spraying a conventional mold release agent, for example, dimethyl polysiloxane.

For continuous production of a large number of articles, however, the mold release agent must be coated each time several number of articles are molded, which leads to a rise in the molding costs. In such a case, it is possible to improve the mold material, but it is also possible to preinsert a methyl polysiloxane compound as an internally added mold release agent in the powder composition.

In this case, the use of a methyl polysiloxane compound having a viscosity at 25° C. of not less than 20 centistokes is suitable. The preferred range of the viscosity is 50 to 5000 centistokes. When the viscosity becomes too large, the effect as a mold release agent is reduced.

The content of the mold release agent should be not more than 2 parts by weight per 100 parts by weight of the powder composition. When the content is more than 2 parts by weight, there is a danger that the heat fusion among elastomer powder particles will be obstructed and only a molded article with inferior mechanical properties will be able to be obtained. Further, there is a danger of bleeding of the mold release agent at the surface of the mold and contamination of the mold.

When the internally added mold release agent is included, the agent may be added either before or after the powdering.

The powder composition usable in the present invention may contain in necessary amounts a phenol type, sulfite type, phenylalkane type, phosphite type, amine type, or amide type stabilizer or other known heat resistance stabilizer, anti-aging agent, weather resistance stabilizer, antistatic agent, metal soap, wax, or other lubricant, coloring pigments, etc. These additives may be added either before or after the powdering.

Next, the foamable composition used in the foamed layer will be explained.

The thermoplastic synthetic resin powder usable in the foamable composition, a powder of a thermoplastic elastomer, polyethylene resin, polypropylene resin, or the like is preferably used.

The thermoplastic elastomer may include, for example, a thermoplastic elastomer comprised of an elastomer composition of the same ethylene-α-olefin copolymer rubber as used in the above-mentioned nonfoam layer and a polyolefin resin, a thermoplastic elastomer comprised of a partially cross-linked composition of an ethylene-α-olefin copolymer rubber and polyolefin resin, and also styrene type, urethane type, polyester type, polyvinyl chloride type, and other thermoplastic elastomers.

The thermoplastic elastomer has a complex dynamic viscosity $\eta^*(1)$ measured at a temperature of 250° C. and a frequency of 1 radian/sec of not more than $1.5 \times 10^5$ poise, preferably not more than $1.0 \times 10^5$ poise, and a Newtonian viscosity index n calculated by the following formula using the complex dynamic viscosity $\eta^*(1)$ measured at 250° C. and a frequency of 1 radian/sec and the complex dynamic viscosity $\eta^*(100)$ measured at a frequency of 100 radians/sec of not more than 0.67, preferably not more than 0.60:

$$n=\{(\log \eta^*(1) - \log \eta^*(100)\}/2$$

Further, examples of the polyethylene resin are high density polyethylene, low density polyethylene, linear low density polyethylene, ethylene-vinyl acetate copolymer, ethylene-methacrylic acid copolymer, ethylene-acrylic ester-maleic anhydride terpolymer, ethylene-glycidyl methacrylate copolymer, ethylene-glycidyl methacrylate-methacrylateterpolymer, ethylene-glycidyl methacrylate-vinyl acetate terpolymer, ethylene-α-olefin copolymer, modified polyolefin, chlorinated polyethylene, and other thermoplastic synthetic resins mainly composed of ethylene.

Examples of the polypropylene resin are propylene homopolymer, propylene-ethylene random copolymer, propylene-ethylene block copolymer, propylene-butene random copolymer, propylene-ethylene-butene terpolymer, etc.

Examples of the thermoplastic synthetic resin powder are, in addition to the above, polyvinyl chloride, polyvinyl chloride-vinyl acetate copolymer, chlorinated polyvinyl chloride, polyvinyl chloride-ethylene-vinyl acetate copolymer, polyvinyl chloride-urethane copolymer, acrylonitrile-butadiene-styrene copolymer, methyl methacrylate-butadiene-styrene copolymer, styrene-butadiene-styrene block copolymer, acrylonitrile-styrene copolymer, and other vinyl based resin powders.

The powders of the polyethylene type resins, polypropylene type resins, vinyl type resins, etc., preferably have a melt flow rate (MFR, measured according to JIS K-7210 at 190° C. or 230° C. under a load of 2.16 kg) of not less than 3 g/10 min and have a particle size such that not less than 95 percent of the total weight passes through a 32 mesh sieve of a Tyler standard sieve. Two or more types of the thermoplastic synthetic resin powder may be used together.

The heat decomposable foaming agent (C) usable in the foamable composition of the present invention is not particularly limited so long as it decomposes upon the heating and melting step in powder molding and generates a gas. A general organic or inorganic chemical foaming agent may be used. Specific examples are azodicarbonamide, 2,2'-azobisisobutyronitrile, azohexahydrobenzonitrile, diazoaminobenzene, and other azo compounds, benzene sulfonylhydrazide, benzene-1,3-sulfonylhydrazide, diphenylsulfone-3,3'-disulfonylhydrazide, diphenyl-oxide-4,4'-disulfonylhydrazide, 4,4'-oxybis(benzenesulfonylhydrazide), paratoluenesulfonylhydrazide, and other sulfonylhydrazide compounds, N,N'-dinitrosopentamethylenetetramine, N,N'-dinitroso-N,N'-dimethylterephthalamide, and other nitroso compounds, terephthalazide, p-tertiary butylbenzazide, and other azide compounds, sodium bicarbonate, ammonium bicarbonate, ammonium carbonate, and other inorganic compounds. These compounds may be used alone or in combination. Among them, azodicarbonamide and 4,4'-oxibis(benzene-sulfonylhydrazide) are preferably used.

The heat decomposable foaming agent usable in the present invention preferably has a decomposition temperature of 120° to 200° C., more preferably 120° to 180° C.

The heat decomposable foaming agent is preferably mixed in an amount of 2 to 11 parts by weight, more preferably 3 to 7 parts by weight, per 100 parts by weight of thermoplastic elastomer powder for powder molding.

It is also possible to use a foaming accelerator or foaming coagent for the purpose of lowering the decomposition temperature of the heat decomposable foaming agent. Examples of the foaming accelerator or foaming coagent, zinc oxide, zinc nitrate, lead phthalate, lead carbonate, trichlorophosphate, tribasic lead sulfate, and other inorganic salts, zinc fatty acid soap, lead fatty acid soap, cadmium fatty acid soap, and other metal soaps, borax, oxalic acid, succinic acid, adipic acid, and other acids, urea, biurea, ethanolamine, glucose, glycerol, etc.

On the other hand, it is also possible to use a foaming suppressing agent for the purpose of raising the decomposition temperature of the heat decomposable foaming agent. Examples of the foaming suppressing agent are organic acids such as maleic acid, fumaric acid, phthalic acid, maleic anhydride, phthalic anhydride, halogenated organic acids such as stearoyl chloride, phthaloyl chloride, polyhydric alcohols such as hydroquinone, organic nitrogen-containing compounds such as fatty acid amine, amide, oxime, isocyanate, organic sulfur-containing compounds such as mercaptan, sulfides, phosphoric acid salts such as phosphite compounds, tin compounds such as dibutyl tin maleate, tin chloride, tin sulfate, hexachlorocyclopentadiene, etc.

According to the present invention the stability of the foam cells can be improved by using a liquid coating agent (D), in addition to the above-mentioned heat decomposing foaming agent.

The liquid coating agent may preferably include a coating agent capable of curing at ordinary temperature to 220° C.

Examples of the liquid coating agent are polysiloxane, melamine type, urethane type, fluorine-containing type, and other heat curable coating agents capable of protecting surfaces of plastic etc., unsaturated polyesters, alkyds, oil-free alkyds, linear polyester resin, and other polyester resins, melamine resins, modified melamine resins, and other amino resins, novolak type, β-methylepichloro type, cyclic fatty acid type, noncyclic fatty acid type, epoxylated fatty acid ester type, polyhydric carbonic acid ester type, aminoglycidyl type, chlorinated type, resorcine type, and other epoxy resins, oil-modified, moisture-curing block polyurethane resins of the single component type, catalyst-curing polyol-curing polyurethane resins of the double component type, and other polyurethane resins, and acrylic resins comprising as main monomers the organic solvent type, aqueous type, solvent-less type, and other acrylic acid esters and methacrylic acid esters. Of these liquid coating agents, polysiloxane, noncyclic fatty acid type and cyclic fatty acid type epoxy resins, and solvent-less acrylic resins such as methacrylic acid esters are preferably used, among which cyclic fatty acid type epoxy resins and solvent-less acrylic resins such as methacrylic acid esters which cure at from ordinary temperature to 150° C. are particularly preferable.

The liquid coating agent preferably has a viscosity of about 50 to 50000 cps at 25° C., but may also be diluted with a solvent upon use. Further, the present invention may make use of an ordinary curing agent at the same time for the purpose of promoting the curing of the liquid coating agent.

An epoxy resin curing agent usable in the present invention may include, for example, diethylene triamine, triethylene tetramine, tetraethylene pentamine, 2,4,6-tris(dimethylaminomethyl)phenol, methaxylylene diamine, and other amine types, phthalic anhydride acid, hexahydrophthalic anhydride, methylnadic anhydride, pyromellitic anhydride, and other acid anhydrides, polyamide resin, and any mixtures thereof. Further, a curing agent for acrylic resins may include, for example, dicumyl peroxide, di-tert-butylperoxide, 2,5-dimethyl- 2,5-di(tert-butylperoxide)hexane, benzoylperoxide, laurylperoxide and other organic peroxides and any mixtures thereof.

The liquid coating agent is preferably mixed in an amount of 0.1 to 8 parts by weight, more preferably 0.2 to 5 parts by weight, per 100 parts by weight of the powder molding thermoplastic synthetic resin powder. The curing agent used is preferably mixed in an amount of not more than 100 parts by weight, in the case of acid anhydrides, and 3 parts by weight in the case of amines and peroxides, based upon 100 parts by weight of the liquid coating agent.

When the foamable composition is produced by mixing the above-mentioned compounds or agents, a heat decomposable foaming agent is usually mixed in the thermoplastic synthetic resin powder (B) and then the liquid coating agent is mixed therein.

The composite foam molded article of the present invention is integrally molded with a nonfoam layer formed from the thermoplastic elastomer powder composition (A) and a foamed layer formed from the thermoplastic synthetic resin powder (B) and the heat decomposable foaming agent (C) or the heat decomposable foaming agent (C) and the liquid coating agent (D). For the molding, the powder molding method is used.

The powder molding method usable in the present invention may include, for example, the fluidized immersion method, the powder sintering method, the electrostatic coating method, the powder flame-spray method, the powder rotational molding method, the powder slush molding method (Japanese Unexamined Patent Publication (Kokai) No. 58-132507), etc., but it is particularly preferable to use the powder slush molding method.

When the powder slush molding method is used, for example, it is possible to produce a composite foam molded article by:

(1) the step of affixing a container having an opening and holding the necessary amount of the thermoplastic elastomer powder (A) and a mold having an opening and heated to a sufficiently high temperature from the melting temperature of the powder so that their openings are aligned or else making them integral affixing the former in the hollow portion in the mold and rotating and/or shaking the same so as to quickly supply the powder from the container in the different portions of the mold to deposit and melt there and of discharging the excess powder to the inside of the container, (2) the step of affixing a container having an opening and holding the necessary amount of the foamable composition and the mold heated to a sufficiently high temperature from the melting temperature of the composition and having the nonfoam layer obtained in the above step (1) so that their openings are aligned or else making them integral and affixing the former in the hollow portion in the mold and rotating and/or shaking the same so as to quickly supply the foamable composition from the container to the different portions of the nonfoam layer to deposit and melt there and of discharging the excess powder composition to the inside of the container, (3) the step of heating the molded article obtained by the step (2) so as to foam.

The system of heating the mold used in the powder molding method is not particularly limited. For example, the gas-fired furnace system, the hot medium oil circulation system, the hot medium oil or hot fluidized sand immersion system, or the high frequency induction heating system may be used. When causing the molten powder composition to foam too, these heating sources may be used.

The molding temperature of the nonfoam layer of the present invention is preferably 160° to 300° C., more preferably 180° to 280° C. The molding time is not particularly limited and may be suitably selected in accordance with the size of the molded article, the thickness of the molded article, etc. Further, the temperature for causing the foamed layer of the present invention to foam is usually 180° to 280° C., preferably 180° to 260° C. The foaming time is not particularly limited and may be suitably selected in accordance with the thickness of the foamed layer and the foaming rate.

A composite foam molded article can be obtained as mentioned above. According to the present invention, it is possible to produce a composite foam molded article having an integral nonfoam layer given a complicated shape and a foam layer with uniform cells and a high foaming rate and further it is possible to obtain a composite foam molded article which is large in size and has a small residual strain.

In addition, it is possible to provide a composite foam molded article which is light in weight and superior in cleanness.

The composite foam molded article of the present invention has the superior properties mentioned above, so can be used in various fields. For example, in the automobile field, it is suitable for the interior covering material for the instrument panel, console box, armrests, headrests, door trims, rear panel, pillar trims, sun visors, trunkroom trims, trunk lid trims, airbag holding box, seat buckles, head liners, glove compartments, steering wheel covers, and ceiling material, interior molded articles such as kicking plate, change lever boot and ceiling material, and external components of an automobile such as the spoiler, side mold, number plate housing, mirror housing, air dam skirt, and mud guard.

Further, in the field of household electrical appliances and office automation equipment, it is suitable, for example, for the covering materials and housings of television sets, video cassette recorders, washing machines, dryers, vacuum cleaners, coolers, air-conditioners, remote control unit cases, microwave ovens, toasters, coffee makers, vacuum bottles, thermos bottles, dish washers, electric shavers, hair dryers, microphones, headphones, beauty equipment, compact disk and cassette storage boxes, personal computers, typewriters, video equipment, telephones, copiers, facsimile machines, telex machines, etc.

In the sporting good field, it is suitable, for example, for decorative parts of sports shoes, rackets of various type of ball games, grips for sports equipment and accessories, saddle coverings and handle grips for bicycles, motor bicycles, and tricycles, etc.

In the construction and housing fields, it is suitable, for example, for covering materials for furniture, tables, chairs, etc., covering materials for doors, gates, fences, etc., decorative wall materials, decorative ceiling materials, curtain wall covering materials, indoor floor materials for kitchens, bathrooms, and toilets, outdoor floor materials for verandas, terraces, balconies, carports, etc., welcome mats, table cloths, coasters, ashtrays, and other articles.

In the field of industrial parts, it is suitable, for example, for grips of power tools, hoses and their covering materials, and packing materials.

In addition to the above, it is suitable, for example, for covering materials of attache cases, cases, files, memo books, albums, stationery, camera bodies, and dolls and other toys, watchbands and other molded articles, and picture frames and their covering materials.

EXAMPLES

The present invention will be explained in detail with reference to the Examples, but the present invention is not intended to be limited to these Examples.

Note that in the Examples and the Comparative Examples, the outer appearance of the covering side and foam side of the composite foam molded article, the thickness of the composite foam molded article, the state of the cells of the foamed layer, and the foaming rate of the foamed layer were evaluated as follows:

Outer Appearance of Covering Side of Composite Foam Molded Article

The covering layer was inspected visually and evaluated in the following way:

Good: The melt-fusion was good and no pinholes were observed.

Poor: The melt-fusion was poor and pinholes were observed.

Outer Appearance of Foam Side of Composite Foam Molded Article

The foam layer was observed visually and evaluated in the following way:

Good: There was no unevenness of thickness and the foaming was uniform.

Fair: There was unevenness of thickness, but the foaming was substantially uniform.

Poor: There was major unevenness of thickness and the foaming was not uniform.

Very poor: There was almost no foaming.

Thickness of Composite Foam Molded Article

The thicknesses of the nonfoam layer and the foam layer were measured by a dial gauge made by Toyo Seiki Seisakusho.

State of Cells of Foam Layer

The cross-section of the foamed article was visually inspected and evaluated in the following way:

Good: The cells were uniform.

Fair: The cells were somewhat nonuniform.

Poor: The cells were nonuniform.

Foaming Rate of Foam Layer

The foaming rate was calculated by the following formula:

Foaming rate=Density of nonfoamed layer/Density of foamed layer

Note that the density of the foamed layer was measured in water using a densimeter made by Toyo Seiki Seisakusho (Densimeter H).

The decomposition temperature of the heat decomposable foaming agent was measured as follows.

A sample was placed in a capillary tube and heated at a heating rate of 2° C./min. by a melting point determination apparatus (Model MP manufactured by Yanagimoto Seisakusho). The temperature at which the foaming was started was determined as a decomposition temperature.

Further, the dynamic viscoelasticity of the thermoplastic elastomer composition was measured as follows.

The dynamic viscoelasticities at 250° C. at vibration frequencies of 1 radian/sec and 100 radian/sec were measured by using a Dynamic Analyzer Model RDS-7700 manufactured by Rheometrics Co. The measurement was conducted in the parallel plate mode under the conditions of an applied strain of 5% and the complex dynamic viscosities $\eta^*(1)$ and $\eta^*(100)$ were calculated.

EXAMPLE 1

A 40 parts by weight amount of oil-extended EPDM ($ML_{1+4}$100° C.=53) comprising 100 parts by weight of EPDM ($ML_{1+4}$100° C., 242, propylene content of 28% by weight, iodine value of 12), and added thereto, 100 parts by weight of a mineral oil softening agent (made by Idemitsu Kosan Co., Ltd., registered trademark Diana Process PW-380) was kneaded with 60 parts by weight of propylene-ethylene random copolymer resin (ethylene content of 5% by weight, MFR of 85 g/10 min), and 0.4 part by weight of a cross-linking coagent (made by Sumitomo Chemical Co., Ltd., registered trademark Sumifine BM-bismaleimide compound) for 10 minutes by a Banbury mixer, then made a pellet-shaped masterbatch for cross-linking by an extrusion machine.

A 0.04 part by weight amount of organic peroxide (made by Sanken Chemical Co., Ltd., registered trademark Sanperox APO (2,5-dimethyl-2,5-di(t-butylperoxy) hexane)) was added to 100 parts by weight of the masterbatch. Dynamic cross-linking was performed at 220° C. using a twin-screw kneader (made by Japan Steel Works, Ltd., registered trademark TEX-44) to obtain elastomer composition pellets. The pellets were cooled to −100° C. using liquid nitrogen, then were pulverized while frozen to obtain a thermoplastic elastomer powder for powder molding having a complex dynamic viscosity $\eta^*(1)$ of $3.1 \times 10^3$ poise and a Newtonian viscosity index n of 0.24.

The powder passed 99% by weight through a 32 mesh sieve of a Tyler standard screen scale sieve.

An embossed nickel plate mold (30 cm×30 cm) was heated in a 300° C. Geer oven. When the surface temperature of the mold became 220° C., the above-mentioned powder molding thermoplastic elastomer powder was sprinkled thereon for 5 seconds. The excess powder was removed, then immediately a thermoplastic elastomer powder composition for powder molding comprised of 100 parts by weight of the same powder molding thermoplastic elastomer powder as the above mixed with 5 parts by weight of a heat decomposable foaming agent, azo compound Cellmic CAP-500 (made by Sankyo Chemical Co., Ltd. main component: azodicarbonamide, decomposition temperature 150° C.) was sprinkled for 20 seconds. The excess powder composition was removed.

Further, the mold was placed in a Geer oven of an atmospheric temperature of 220° C. and was heated for 60 seconds to foam the composition.

Next, the mold was taken out from the Geer oven and cooled by water, then the composite foam molded article was removed from the mold.

The results of evaluation of the resultant composite foam molded article are shown in Table 1.

EXAMPLE 2

Except for using 60 parts by weight of propylene-butene random copolymer resin (butene content of 24% by weight and MFR of 90 g/10 min) and using 40 parts by weight of the oil-extended EPDM in Example 1, the same conditions as in Example 1 were followed to obtain a powder molding thermoplastic elastomer powder having a complex dynamic viscosity $\eta^*(1)$ of $6.9 \times 10^3$ poise and a Newtonian viscosity index n of 0.39.

The powder passed 99% by weight through a 32 mesh sieve of a Tyler standard sieve.

A 5 parts by weight amount of the same heat decomposable foaming agent as in Example 1 was mixed with 100 parts by weight of the same powder as this powder to obtain a foamable thermoplastic elastomer powder composition.

Thereafter, a composite foam molded article was produced under the same conditions as Example 1. The results of the evaluation of the composite foam molded article are shown in Table 1.

EXAMPLE 3

Except for using 50 parts by weight of propylene-ethylene random copolymer resin (ethylene content of 3% by weight and MFR of 60 g/10 min) and using 50 parts by weight, instead of 40 parts by weight, of the oil-extended EPDM in Example 1, the same conditions as in Example 1 were followed to obtain a powder molding thermoplastic elastomer powder having a complex dynamic viscosity $\eta^*(1)$ of $3.4 \times 10^4$ poise and a Newtonian viscosity index n of 0.59.

The powder passed 99% by weight through a 32 mesh sieve of a Tyler standard sieve.

A 5 parts by weight amount of the same heat decomposable foaming agent as in Example 1 was mixed with 100 parts by weight of the same powder as this powder to obtain a foamable thermoplastic elastomer powder composition.

Thereafter, a composite foam molded article was produced under the same conditions as Example 1. The results of the evaluation of the composite foam molded article are shown in Table 1.

COMPARATIVE EXAMPLE 1

Except for using 50 parts by weight of propylene-ethylene random copolymer resin (ethylene content of 3% by weight and MFR of 10 g/10 min) and using 50 parts by weight, instead of 40 parts by weight, of the oil-extended EPDM in Example 1, the same conditions as in Example 1 were followed to obtain a powder molding thermoplastic elastomer powder having a complex dynamic viscosity $\eta^*(1)$ of $2.3 \times 10^5$ poise and a Newtonian viscosity index n of 0.76.

The powder passed 99% by weight through a 32 mesh sieve of a Tyler standard sieve.

Thereafter, a composite foam molded article was produced under the same conditions as Example 1. The results of the evaluation of the composite foam molded article are shown in Table 1.

COMPARATIVE EXAMPLE 2

A 60 parts by weight amount of EPDM ($ML_{1+4}$100° C. of 86, propylene content of 50% by weight, iodine value of 8), 20 parts by weight of EPM ($ML_{1+4}$100° C. of 143, propylene content of 53% by weight), and 20 parts by weight of homopolypropylene (MFR of 10 g/10 min) were mixed in Banbury mixer. A 0.28 part by weight amount of Sanperox APO was added per 100 parts by weight, then the mixture was dynamically cross-linked by a twin-screw mixer to obtain elastomer composition pellets.

These pellets were pulverized in the same way as in Example 1, whereby a thermoplastic elastomer powder having a complex dynamic viscosity $\eta^*(1)$ of $5.7 \times 10^5$ poise and a Newtonian viscosity index n of 0.79 was obtained.

The powder passed 99% by weight through a 32 mesh sieve of a Tyler standard sieve.

A composite foam molded article was produced under the same conditions as in Example 1. The results of evaluation are shown in Table 1.

COMPARATIVE EXAMPLE 3

A 52 parts by weight amount of oil-extended EPDM ($ML_{1+4}$100° C. of 78) comprising 100 parts of EPDM ($ML_{1+4}$100° C. of 145, propylene content of 36% by weight, iodine value of 10), and added thereto, 40 parts by weight of a mineral oil softening agent (Diana Process PW-380) was kneaded with 27 parts by weight of homopolypropylene (MFR of 20 g/10 min), 21 parts by weight of propylene-butene random copolymer (butene content of 24%, MFR of 4 g/10 min), and 0.2 part by weight of a cross-linking agent (Sumifine® BM) by Banbury mixer. A 0.23 part by weight amount of an organic peroxide (made by Sanken Chemical Co., Ltd., Sanperox TY-1,3) was added per 100 parts by weight of this, then the mixture was dynamically cross-linked by a twin-screw mixer to obtain elastomer composition pellets.

These were pulverized in the same way as in Example 1, whereby a thermoplastic elastomer powder having a complex dynamic viscosity $\eta^*(1)$ of $1.9\times10^5$ poise and a Newtonian viscosity index n of 0.83 was obtained.

The powder passed 99% by weight through a 32 mesh sieve of a Tyler standard sieve.

A composite foam molded article was produced under the same conditions as in Example 1. The results of evaluation are shown in Table 1.

EXAMPLE 4

Except for using 5 parts by weight of Cellmic S (made by Sankyo Chemical Co., Ltd., 4,4'-oxybis (benzenesulfonylhydrazide)) instead of the heat decomposable foaming agent Cellmic CAP-500 in Example 1, Example 1 was followed to obtain a composite foam molded article. The results of evaluation are shown in Table 1.

COMPARATIVE EXAMPLE 4

Except for using 1.5 parts by weight of the heat decomposable foaming agent Cellmic CAP-500 in Example 1, Example 1 was followed to obtain a composite foam molded article. The results of evaluation are shown in Table 1.

EXAMPLE 5

Except for using 3 parts by weight of the heat decomposable foaming agent Cellmic CAP-500 in Example 1, Example 1 was followed to obtain a composite foam molded article. The results of evaluation are shown in Table 1.

EXAMPLE 6

Except for using 10 parts by weight of the heat decomposable foaming agent Cellmic CAP-500 in Example 1, Example 1 was followed to obtain a composite foam molded article. The results of evaluation are shown in Table 1.

COMPARATIVE EXAMPLE 5

Except for using 12 parts by weight of the heat decomposable foaming agent Cellmic CAP-500 in Example 1, Example 1 was followed to obtain a composite foam molded article. The results of evaluation are shown in Table 1.

EXAMPLE 7

Except for the use, as the foam thermoplastic elastomer powder composition in Example 2, of a composition obtained by 5 parts by weight of the same heat decomposable foaming agent as used in Example 2, 0.5 part by weight of liquid coating agent (made by Dainippon Ink & Chemicals, Inc., registered trademark Monocizer TD- 1500, trimethylolpropane-methacrylate) diluted by 20 ml of ethyl acetate, and 0.005 part by weight of dicumylperoxide (made by Sanken Chemical Co., Ltd., registered trademark Sanperox DC-98) diluted by 10 ml of methylethylketone, based upon 100 parts by weight of the powder molding thermoplastic elastomer powder obtained in the same way as in Example 2, the same procedure as in Example 2 as followed to produce a composite foam molded article. The results of the evaluation are shown in Table 1.

EXAMPLE 8

Except for the use, as the foam thermoplastic elastomer powder composition in Example 2, of a composition obtained by mixing 5 parts by weight of the same heat decomposable foaming agent as used in Example 2, 0.5 part by weight of liquid coating agent (made by Sumitomo Chemical Co., Ltd., registered trademark Sumiepoxy ELA115, cyclic aliphatic epoxy resin polymerized from epichlorohydrine and bisphenol A), and 0.005 part by weight of a curing agent, triethylene tetramine, based upon 100 parts by weight of the powder molding thermoplastic elastomer powder obtained in the same way as in Example 2, the same procedure as in Example 2 as followed to produce a composite foam molded article. The results of the evaluation are shown in Table 1.

COMPARATIVE EXAMPLE 6

Except for the use of 10 parts by weight of the liquid coating agent and 1 part by weight of the curing agent in Example 8, the same procedure as in Example 8 was followed to produce a composite foam molded article. The results of the evaluation are shown in Table 1.

EXAMPLE 9

A powder produced in the same way as Example 2 was used as the powder molding thermoplastic elastomer powder.

An embossed nickel plate mold (30 cm×30 cm) was heated in a 300° C. Geer oven. When the surface temperature of the mold became 250° C., the powder molding thermoplastic elastomer powder was sprinkled on it for 5 seconds. The excess powder was removed, then immediately a foamable polyethylene resin powder composition obtained by mixing 3 parts by weight of a heat decomposable foaming agent, azodicarbonamide (made by Sankyo Chemical Co., Ltd., Cellmic CAP-250, decomposition temperature of 145° C.) in 100 parts by weight of a straight chain low density polyethylene resin powder (made by Sumitomo Seika, FLO-THENE F-13142-N, MFR of 10 g/10 min, average particle size of 80±10 mesh) was sprinkled for 20 seconds. The excess powder composition was removed. Further, the mold was placed in a Geer oven of an atmospheric temperature of 200° C. and was heated for 70 seconds to foam the composition. Next, the mold was taken out from the Geer oven and cooled by water, then the composite foam molded article was removed from the mold. The results of evaluation are shown in Table 1.

EXAMPLE 10

Except for using a foamable ethylene-vinyl acetate copolymer resin powder composition comprised of 3 parts by weight of the heat decomposable foaming agent azodicarbonamide (made by Sankyo Chemical Co., Ltd., Cellmic CAP-250, decomposition temperature of 145° C.) mixed with 100 parts by weight of ethylene-vinyl acetate copolymer resin powder (made by Sumitomo Seika Co., Ltd., Flowbac H4001N, vinyl acetate content of 20% by weight, MFR of 20 g/10 min, average particle size of 55±5 mesh) instead of the foamable thermoplastic elastomer powder composition in Example 1 and foaming in a 200° C. Geer oven for 60 seconds, the same procedure was followed as in Example 1 to produce a composite foam molded article. The results of the evaluation are shown in Table 1.

EXAMPLE 11

Except for using a composition comprised of 2.5 parts by weight of the heat decomposable foaming agent azodicarbonamide (made by Sankyo Chemical Co., Ltd., Cellmic CAP-250, decomposition temperature of 145° C.) mixed with 100 parts by weight of propylene-butene random copolymer resin powder (made by Sumitomo Chemical Co, Ltd., BH190G, butene content of 24% by weight, MFR of 79.1 g/10 min, average particle size of 133 μm) instead of the foam thermoplastic elastomer powder composition in Example 2, the same procedure was followed as in Example 2 to produce a composite foam molded article. The results of the evaluation are shown in Table 1.

EXAMPLE 12

Except for using a composition comprised of 3 parts by weight of the heat decomposable foaming agent azodicarbonamide (made by Sankyo Chemical Co., Ltd., Cellmic CAP-250, decomposition temperature of 145° C.) mixed with 100 parts by weight of ethylene-methyl methacrylate copolymer resin powder (made by Sumitomo Chemical Co, Ltd., Acryft WH501, methyl methacrylate content of 20% by weight, MFR of 70 g/10 min, average particle size of 160 μm) instead of the foamable thermoplastic elastomer powder composition in Example 2, the same procedure was followed as in Example 2 to produce a composite foam molded article. The results of the evaluation are shown in Table 1.

EXAMPLE 13

Except for using a composition comprised of 3 parts by weight of the heat decomposable foaming agent azodicarbonamide (made by Sankyo Chemical Co., Ltd., Cellmic CAP-250, decomposition temperature of 145° C.) mixed with 100 parts by weight of ethylene-glycidyl methacrylate-vinyl acetate terpolymer resin powder (made by Sumitomo Chemical Co, Ltd., Bondfast 20B, glycidyl methacrylate content of 12% by weight, vinyl acetate content of 5% by weight, MFR of 20 g/10 min, average particle size of 324 μm) instead of the foamable thermoplastic elastomer powder composition in Example 2, the same procedure was followed as in Example 2 to produce a composite foam molded article. The results of the evaluation are shown in Table 1.

EXAMPLE 14

Except for using a composition comprised of 3 parts by weight of the heat decomposable foaming agent azodicarbonamide (made by Sankyo Chemical Co., Ltd., Cellmic CAP-250, decomposition temperature of 145° C.) mixed with 100 parts by weight of ethylene-acrylic acid ester-anhydrous maleic acid terpolymer resin powder (made by Sumika Atochim Co., Ltd., Bondine HX8210, comonomer content of 9% by weight, MFR of 200 g/10 min, average particle size of 313 μm) instead of the foam thermoplastic elastomer powder composition in Example 2, the same procedure was followed as in Example 2 to produce a composite foam molded article. The results of the evaluation are shown in Table 1.

COMPARATIVE EXAMPLE 7

Except for using a composition comprised of 3 parts by weight of the heat decomposable foaming agent azodicarbonamide (made by Sankyo Chemical Co., Ltd., Cellmic CAP-250, decomposition temperature of 145° C.) mixed in with 100 parts by weight of polyurethane resin powder (pure product of resin obtained by causing a reaction of 50 parts by weight of polymeric MDI with an NCO content of 30.5% based upon 100 parts by weight of a mixture comprised of polyols, mainly comprised of propylene oxide and ethylene oxide additions product of glycerol, water, triethanolamine, and triethylene diamine, particle size of about 300 μm, not melting at 190° C.) instead of the foamable thermoplastic elastomer powder composition in Example 2, the same procedure was followed as in Example 2 to produce a composite foam molded article. The results of the evaluation are shown in Table 1.

TABLE 1

| No. | Outer appearance of covering side of molded article | Outer appearance of foam side of molded article | Thickness of nonfoam layer (mm) | Thickness of foam layer (mm) | State of cells of foam layer | Foaming ratio of foam layer |
|---|---|---|---|---|---|---|
| Ex. 1 | Good | Good | 0.7 | 2.7 | Good | 3.9 |
| Ex. 2 | Good | Good | 0.7 | 2.6 | Good | 3.7 |
| Ex. 3 | Good | Good | 0.7 | 2.4 | Good | 2.8 |
| Comp. Ex. 1 | Poor | Poor | — | — | Poor | — |
| Comp. Ex. 2 | Poor | Poor | — | — | Poor | — |
| Comp. Ex. 3 | Poor | Poor | — | — | Poor | — |
| Ex. 4 | Good | Good | 0.7 | 2.2 | Good | 2.5 |
| Comp. Ex. 4 | Good | Poor | 0.7 | 1.9 | Poor | 2.0 |
| Ex. 5 | Good | Good | 0.7 | 2.4 | Good | 2.7 |
| Ex. 6 | Good | Fair | 0.7 | 3.7 | Fair | 7.6 |
| Comp. Ex. 5 | Good | Poor | 0.7 | 3.8 | Poor | 8.0 |
| Ex. 7 | Good | Good | 0.7 | 4.5 | Good | 5.5 |
| Ex. 8 | Good | Good | 0.7 | 4.3 | Good | 5.2 |
| Comp. Ex. 6 | Good | Very poor | 0.7 | 1.7 | Poor | 1.7 |
| Ex. 9 | Good | Good | 0.8 | 4.3 | Good | 4.9 |
| Ex. 10 | Good | Good | 0.7 | 4.1 | Good | 3.8 |
| Ex. 11 | Good | Good | 0.7 | 3.8 | Good | 3.5 |
| Ex. 12 | Good | Good | 0.7 | 3.2 | Good | 3.3 |
| Ex. 13 | Good | Fair | 0.7 | 6.0 | Good | 3.5 |
| Ex. 14 | Good | Fair | 0.7 | 3.6 | Fair | 3.6 |
| Comp. Ex. 7 | Good | Very poor | 0.7 | — | Poor | — |

EXAMPLE 15

A colorable thermoplastic elastomer powder (resin powder 5000 g) comprised of the thermoplastic elastomer powder obtained in the same way as in Example 2 mixed with 1.0 part by weight of a white pigment (made by Sumika Color Co., Ltd., White PV742) was fed into a 20 liter capacity supermixer and mixed for 10 minutes at 500 rpm to obtain 5050 g of a white substance of a powder molding thermoplastic elastomer powder composition (nonfoam layer use).

To the foamable thermoplastic elastomer powder composition obtained in the same way as in Example 2 was mixed 1.0 part by weight of a pigment (made by Sumika Color Co., Ltd., made of a mixture of White PV 742 in 0.7 part by weight and Black PV-817 in 0.3 part by weight) to obtain 5300 g of a foamable thermoplastic elastomer powder composition colored gray.

Figure 2:
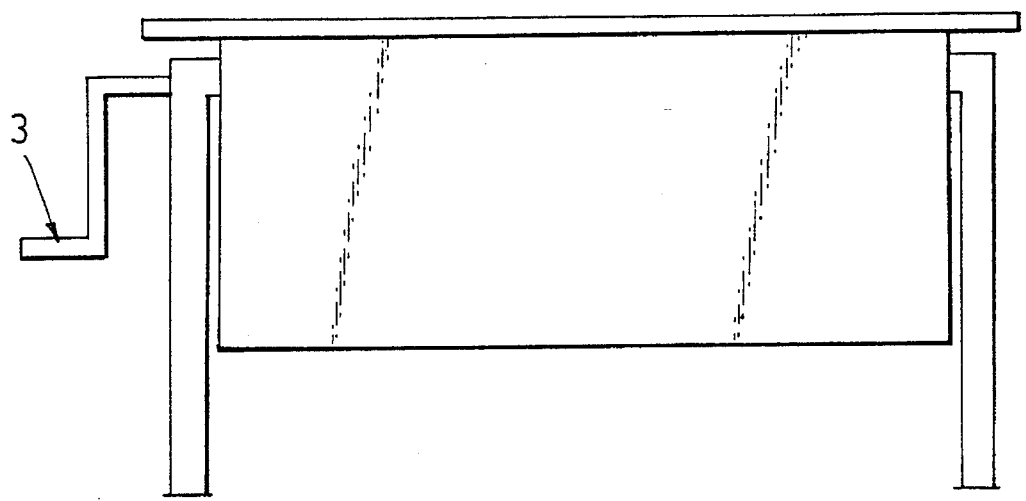
FIG. 2 is an elevation view of the powder feed box.
Figure 3:
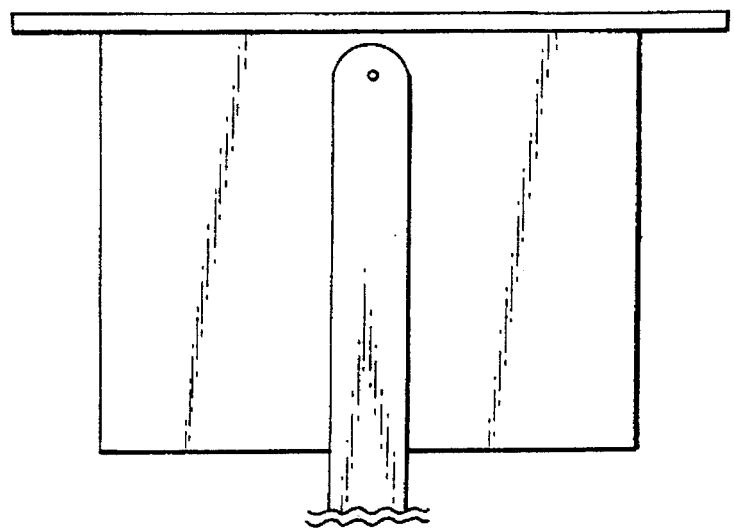
FIG. 3 is a side view of the powder feed box.

Two of the stainless steel rectangular containers (powder feed boxes) shown in FIG. 1 to FIG. 3 were prepared. To one container, 4000 g of the thermoplastic elastomer powder composition for the nonfoam layer was fed and to the other container, 4000 g of the foamable thermoplastic elastomer powder composition was fed. The rectangular containers have a rectangular opening 1 of 600 mm×220 mm, and a depth of 210 mm, and were designed to be mounted to a single-screw rotating apparatus 3.

Figure 4:
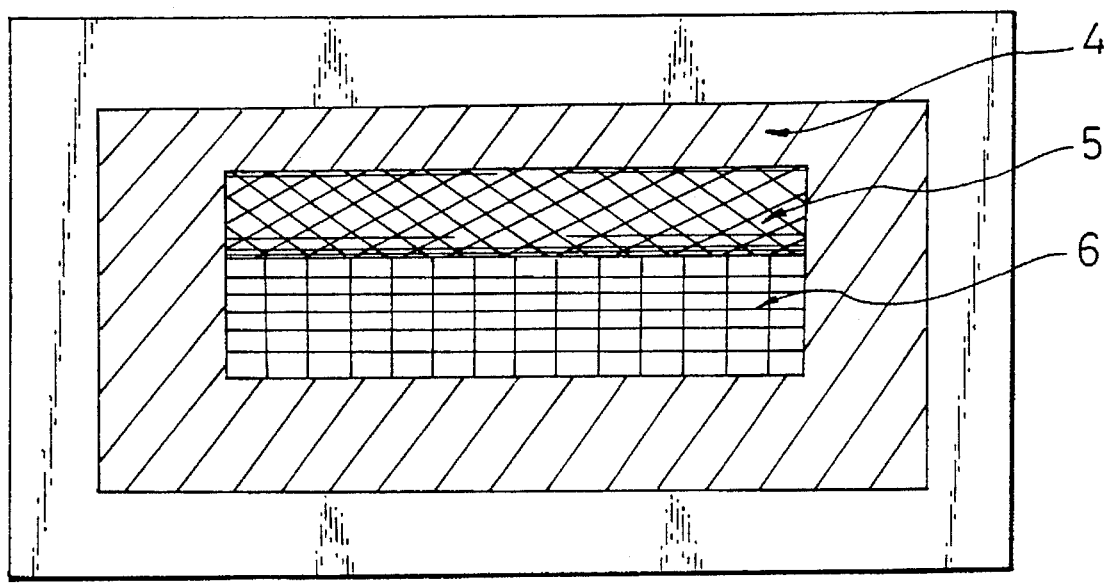
FIG. 4 is a plane view of a mold.
Figure 5:
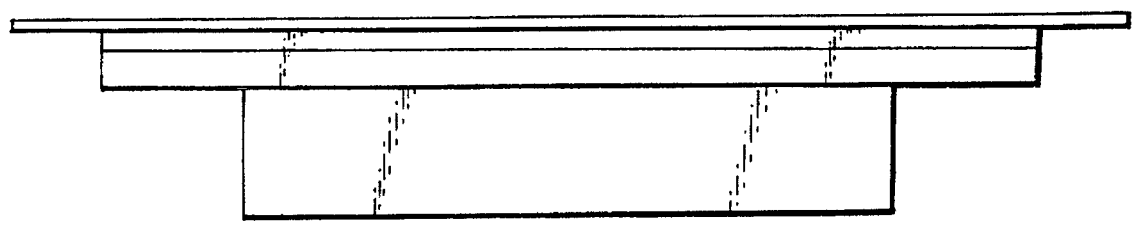
FIG. 5 is an elevation view of the mold.
Figure 6:
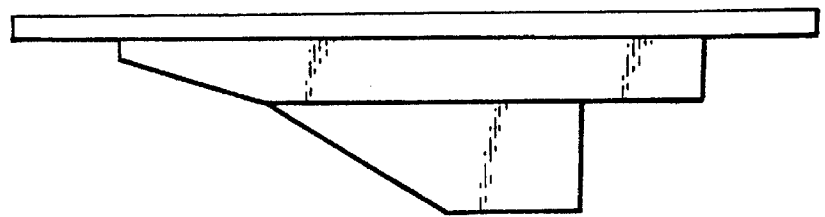
FIG. 6 is a side view of the mold.

On the other hand, a nickel electrocasted mold shown in FIG. 4 to FIG. 6 having an opening 4 of the same size as the opening 1 of the powder feed boxes shown in FIG. 1. The mold had a thickness of 3 mm and had a complicated shape with a rope pattern 5 and a leather grain pattern 6 on its inner surface. When the surface temperature of the mold reached 250° C. the heated mold was immediately positioned so that its opening 4 (600 mm×220 mm) faced downward, was placed aligned with the opening 1 of the powder feed box filled with the thermoplastic elastomer powder composition for the nonfoam layer, the outer frame attached around the two openings was clamped tight, and the clip 2 was used to affix it to make the assembly an integral piece.

When the surface temperature of the mold became 220° C., the powder feed box filled with the thermoplastic elastomer powder composition for the nonfoam layer was immediately turned 180° and the powder was brought into contact with the mold for 3 seconds to melt adhere it to the same. Immediately thereafter, the powder feed box was turned 180° to return it to its original position and the excess powder adhering to the complicated shape portions was swept off into the powder feed box.

Immediately, the opening 4 of the mold forming the nonfoam layer as positioned to face downward, the opening 4 of the mold was placed aligned with the opening 1 of the powder feed box containing the foamable thermoplastic elastomer powder composition, an outer frame attached around the two openings was clamped closely, and the clip 2 was used to affix the same and make the assembly an integral piece. The surface temperature of the mold at this time was 189° C.

Immediately, the powder feed box containing the foamable thermoplastic elastomer powder composition was rotated 180° and the powder composition was brought into contact with the mold for 15 seconds to melt-adhere it to the same. Then, the powder feed box was rotated 180° to return it to its original position. The excess powder composition adhering to the complicated shape portion was swept off into the powder feed box.

With the opening 4 of the mold facing downward, the mold was detached from the powder feed box.

Next, the mold was post-heated for one minute in a heating furnace of 200° C. then immediately cooled by water, after which the molded article was removed from the mold.

The resultant composite foam molded article had a nonfoam layer of 120 g and a thickness of 0.7 mm and a foam layer of 110 g and a thickness of 3.3 mm, with a foam rate of 4.0. The nonfoam layer did not have any underfills or pinholes and faithfully reproduced the rope pattern and leather grain pattern. Further, the foam layer had uniform foam cells.

EXAMPLE 16

Figure 7:
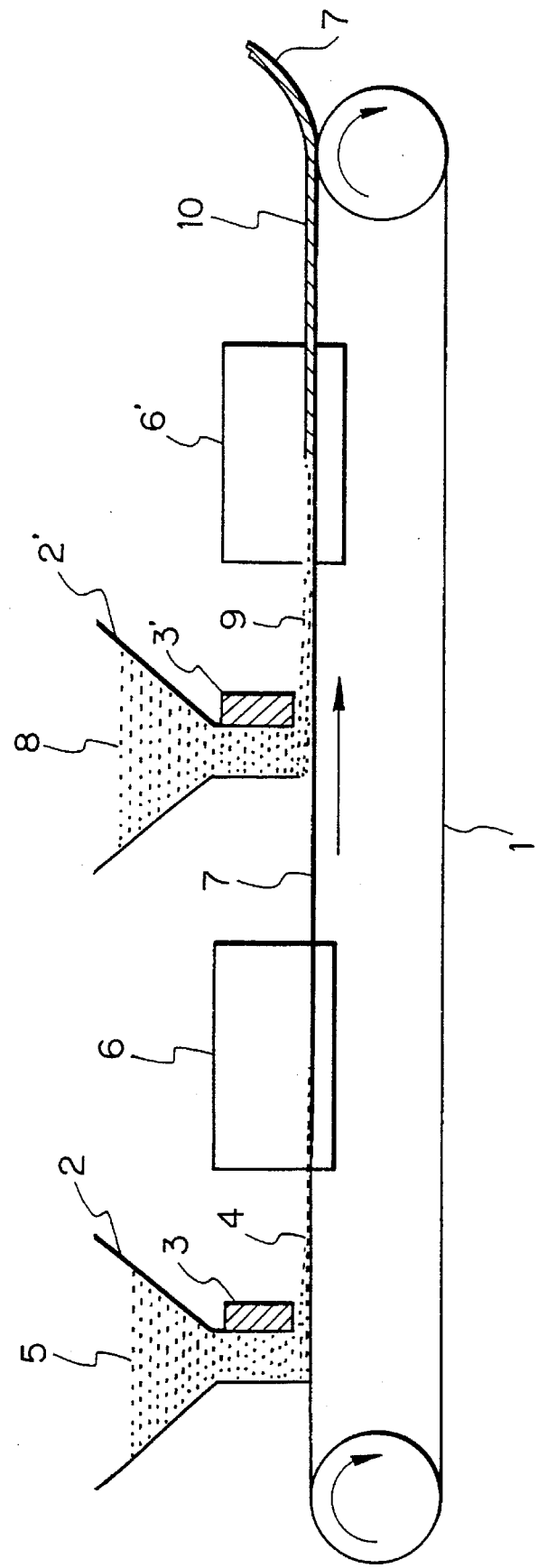
FIG. 7 is a schematic sectional view of the process for manufacturing a sintered sheet.

In the apparatus shown in FIG. 7, the powder molding thermoplastic elastomer powder 5 obtained in the same way as in Example 1 was charged into the hopper 2. Further, a foamable thermoplastic elastomer powder composition 8 obtained by mixing 5 parts by weight of the heat decomposable foaming agent azodicarbonamide (made by Sankyo Chemical Co., Ltd., Cellmic CAP-500, decomposition temperature of 150° C.) in 100 parts by weight of the same powder molding thermoplastic elastomer powder was charged into the hopper 2'.

The belt speed was adjusted to 1.75 m/min. The belt 1 used was a stainless steel one of a width of 30 cm and a thickness of 1 mm. The front sintering furnace 6 and the rear sintering furnace 6' were set to 200° C. The surface temperature of the belt was 120° C. The thickness adjusting plate 3 was adjusted to form a 2 mm powder layer 4'. The powder layer 4 was led into the sintering furnace 6 together with the progression of the belt and was sintered. The resultant sintered sheet was 0.7 mm in thickness and the surface was uniformly smooth.

Next, the above-mentioned foamable thermoplastic elastomer powder composition 8 was charged on the sintered sheet (nonfoam sheet layer) from the hopper 2 and was adjusted by a thickness adjusting plate 3' to form the foamable powder composition layer 9. The layer comprised of the nonfoam sheet layer and the foamable powder composition layer was passed through the rear sintering furnace 6' set to 200° C.

The sintered sheet obtained above was an integral multilayer sintered sheet comprised of the nonfoam sheet layer and the foamed sheet layer. The multilayer sintered sheet had a thickness of the nonfoam sheet layer of 0.7 mm and a thickness of the foam sheet layer of 2.5 mm. The multilayer sintered sheet had a uniformly smooth surface and an excellent cushioning property.

We claim:

1. A foamable powder molding composition which comprises 2 to 11 parts by weight of a heat decomposable foaming agent and 100 parts by weight of a thermoplastic elastomer powder selected from the group consisting of (a) a composition of an ethylene-alpha-olefin copolymer rubber and a polyolefin resin, and (b) a composition obtained by partially cross-linking an ethylene-alpha-olefin copolymer rubber and a polyolefin resin, said thermoplastic elastomer powder having a complex dynamic viscosity $\eta^*(1)$ at 250° C. and a frequency of 1 radian/sec of not more than $1.5 \times 10^5$ poise and having a Newtonian viscosity index n, calculated by the following formula using the above-mentioned complex dynamic viscosity $\eta^*(100)$ at a frequency of 100 radians/sec, of not more than 0.67:

$$n = \{\log \eta^*(1) - \log \eta^*(100)\}/2$$

wherein the Mooney viscosity ($ML_{1+4}$ 100° C.) of the ethylene-alpha-olefin copolymer rubber is 130 to 350.

2. The foamable powder molding composition according to claim 1, wherein the process further comprises a liquid coating agent in an amount of 0.1 to 8 parts by weight of the thermoplastic elastomer.

3. The foamable powder molding composition according to claim 1 or 2, wherein the ethylene-alpha-olefin copolymer rubber is an ethylene-propylene-ethylidene norborane rubber.

4. The foamable powder molding composition according to claim 1 or 2, wherein the ethylene-alpha-olefin copolymer is an oil-extended olefin copolymer rubber.

5. The foamable powder molding composition according to claim 1 or 2, wherein the polyolefin resin is selected from the group consisting of polypropylene, a copolymer of propylene and ethylene and a copolymer of propylene and butene.

6. The foamable powder molding composition according to claim 1 or 2, wherein the ratio of the ethylene-alpha-olefin copolymer rubber and the olefin resin is 5:95 to 80:20 by weight.

7. The foamable powder molding composition according to claim 1 or 2, wherein the heat decomposable foaming agent is selected from the group consisting of an azo compound and a sulfonyl-hydrazide compound.

8. The foamable powder molding composition according to claim 2, wherein the liquid coating agent is selected from the group consisting of polysiloxane, an epoxy resin and an acrylic resin.

* * * * *